W. HERRMANN.
Cotton-Cleaner.
No. 200,721.   Patented Feb. 26, 1878.
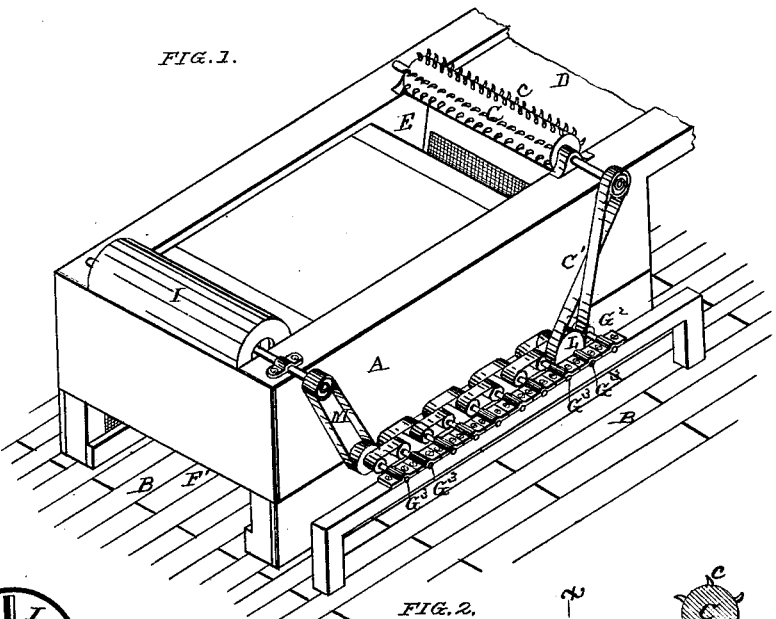
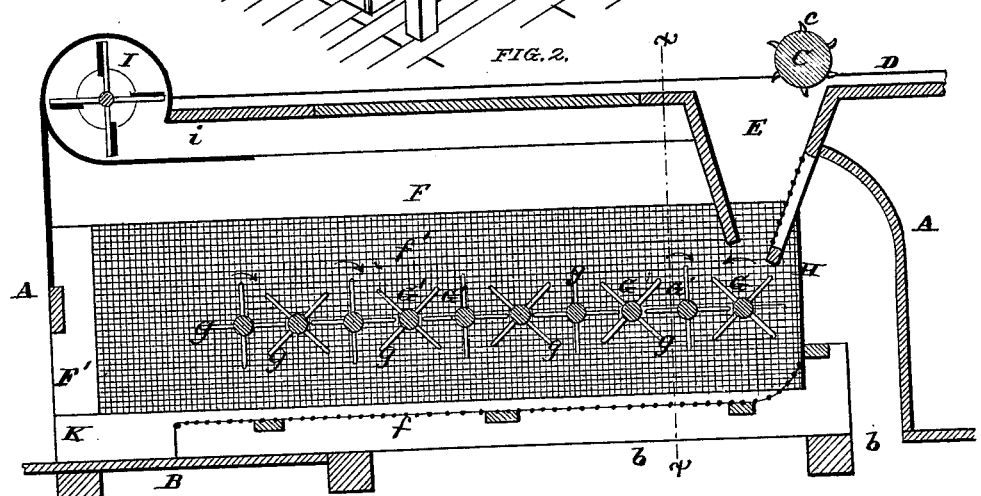
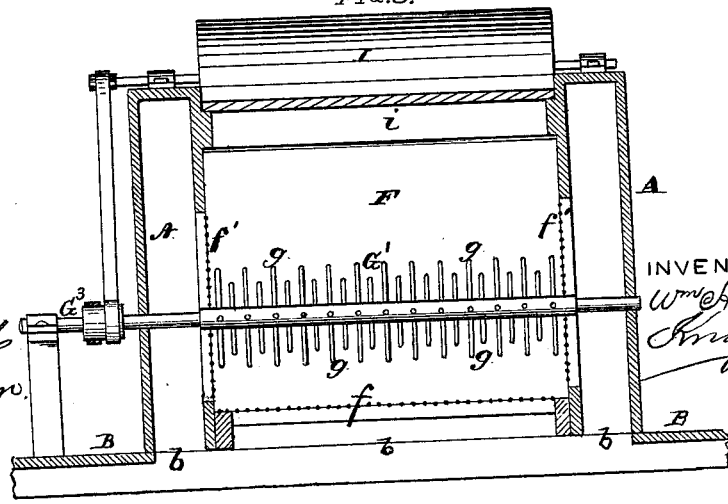
ATTEST:
Chas J. Gooch
W. R. Edelen
INVENTOR:
Wm Herrmann
Knight &co

UNITED STATES PATENT OFFICE.

WILLIAM HERRMANN, OF COTTON PLANT, MISSOURI.

IMPROVEMENT IN COTTON-CLEANERS.

Specification forming part of Letters Patent No. 200,721, dated February 26, 1878; application filed October 8, 1877.

*To all whom it may concern:*

Be it known that I, WILLIAM HERRMANN, of Cotton Plant, Duncan county, Missouri, have invented a certain new and useful Improvement in Cotton-Cleaners, of which the following is a description, reference being had to the accompanying drawings, forming part of this specification.

My improvement relates to a machine for cleaning cotton in the seed before ginning; and it consists of a number of rotary beaters in a case, having sides and bottom composed of gauze, to allow the escape of dust, &c. A blower at one end of the machine supplies a blast of air to carry away the dust from the upper part of the chamber. The beater-chamber is inclosed in an outer case that is in communication with the space beneath the floor or platform on which the machine stands.

In the drawings, Figure 1 is a perspective view of the machine. Fig. 2 is a longitudinal vertical section. Fig. 3 is a transverse vertical section at $x\ x$, Fig. 2.

A is the outer case, which may be supported on a floor or platform, B. The platform has openings $b$ for the escape of the impurities separated from the cotton.

C is a feed-roller supplied with points $c$, to engage the cotton which is upon feed-board D and drop it into the hopper E. From the hopper the cotton drops into a trough or chamber, F, which is open at both ends, and whose bottom and sides consist of gauze or wire-work, $f$ and $f'$, respectively.

G $G^1$ $G^1$, &c., are a number of rotary beaters, which beat the cotton in the chamber F, and carry it forward to the discharge end F'.

The cotton first falls upon the beater G, which rotates in the direction shown by the arrow, and the cotton is carried by its fingers $g$ to the bottom of the chamber, beneath the beaters $G^1$, which all rotate in the opposite direction, as shown by the arrows, so as to carry the cotton forward to the other end.

The action of each beater-finger is to first knock the ascending cotton from the fingers of the preceding beater, and then to throw it up against the fingers of the succeeding beater; and thus the impurities are dislodged from the cotton, and either fall through the gauze $f$ or $f'$, or else float up into the top of the chamber, and are blown out through and over the gauze, and at the feed end of the machine the hopper has a gauze which is open beneath the hopper at H and at the outer side to allow the passage of impurities.

The blower is shown at I, and air which enters the blower-case at the ends is discharged through a spout, $i$, to cause the current to move toward the hopper. The cotton is discharged through the open end at K.

The various shafts, feed-roller, and blower may receive motion in any suitable manner. The system I have adopted is shown in Fig. 1, where L is the main shaft, having crossed-belt connection C' with the feed-roller, and friction or cog connection with the roller $G^2$ upon one side, and upon the other side it has belt-connection with shaft $G^3$, the main shaft, where it passes through the machine, forming one of the shafts $G^3$.

Each of the shafts $G^3$ has straight-belt connection with the next one toward end K, so that they all turn together.

The last of the beater-shafts has straight-belt connection M with the shaft of blower I.

The cotton, as it leaves the machine, may be carried by an endless belt or other conveyer direct to the gin, and this conveyer may be actuated by belt or other connection to either the cleaner or the gin.

As the cleaner operates on the cotton before the removal of the seed, there is scarcely any loose fluff or wool, and, consequently, the cotton is not wasted by the air-current through the cleaner.

I claim as my invention—

1. In a cotton-cleaner, the combination of beater G, located beneath the hopper, and a series of beaters, $G^1$, operating in opposite direction to the beater G, said beaters G and $G^1$ being provided with fingers $g$, adapted to overlap in the manner described, so as to convey the cotton from one end of the chamber to the other.

2. The combination of the box or chamber F, having wire sides $ff'$, and a series of beaters, $G^1 g$, as and for the purpose set forth.

3. The combination, with the wire-sided box or chamber $F ff'$, of a series of beaters $G^1$ and blower I, arranged within said chamber.

4. A cotton-cleaner consisting of case A, feed-roller C, chamber F, having wire sides $f f'$, blast-fan I, and rotary beaters $G\ G^1$, all substantially as and for the purpose set forth.

WILLIAM HERRMANN.

In presence of—
WM. M. SATTERFIELD,
J. J. MILLER.